United States Patent [19]

Watanabe et al.

[11] Patent Number: 4,714,155
[45] Date of Patent: Dec. 22, 1987

[54] RUNWAY FOR A CONVEYOR MEANS USING LINEAR MOTORS

[75] Inventors: Seiji Watanabe; Teiji Horimoto, both of Sano; Susumu Koizumi, Oyama, all of Japan

[73] Assignee: Hitachi Kiden Kogyo Kabushiki Kaisha, Hyogo, Japan

[21] Appl. No.: 804,258

[22] Filed: Dec. 3, 1985

[30] Foreign Application Priority Data

Dec. 3, 1984 [JP] Japan .................. 59-183889[U]

[51] Int. Cl.⁴ .............................................. B65G 35/00
[52] U.S. Cl. .................................. 198/619; 104/23.2
[58] Field of Search .................. 198/619, 811, 950; 104/22, 134, 155, 23.1, 23.2; 406/88, 103, 86, 87

[56] References Cited

U.S. PATENT DOCUMENTS

| | | | |
|---|---|---|---|
| 3,257,964 | 6/1966 | Connors | 104/134 |
| 3,473,910 | 10/1969 | Wilde et al. | 406/88 |
| 3,500,765 | 3/1970 | Easton et al. | 104/23.2 |
| 3,610,695 | 10/1971 | Yabuta | 198/619 |
| 4,662,282 | 5/1987 | Fukuwatari | 104/23.2 |

Primary Examiner—Robert J. Spar
Assistant Examiner—Lyle Kimms
Attorney, Agent, or Firm—Wenderoth, Lind & Ponack

[57] ABSTRACT

A runway for a conveyor whereby a transporting pallet which straddles the runway is floated in the air by air discharged from the runway and is conveyed by a linear motor provided in the runway. Air ducts to supply air to the upper part of the runway are provided symmetrically. Compressed air discharged upwardly and sideways from nozzle holes at the upper part of the runway floats the transporting pallet which runs above and along the runway by operation of the linear motor. The runway having open spaces for air ducts and an open space for installation of linear motors is made by extrusion from a metallic mold.

3 Claims, 4 Drawing Figures

4,714,155

RUNWAY FOR A CONVEYOR MEANS USING LINEAR MOTORS

BACKGROUND OF THE INVENTION

1. Field of the Invention

This invention relates to a runway for a conveyor using linear motors and which is suitable for use in a clean room which must be free from dust.

2. Prior Art

In semiconductor (such as LSI, super LSI, etc.) manufacturing plants, medicine manufacturing plants, etc., it is a fact that with the recent automation of dust-free workshops, dust-free conveyors between processes and between processing machines have been put to practical use.

As an example of such a dust-free conveyor, there is a system whereby a pallet on which articles for transportation are loaded is floated in the air by compressed clean air discharged from nozzle holes made on the surface of a runway and is transported by thrust imparted thereto by a linear motor provided in the runway.

In the runway, which is an important component of the above dust-free conveyor, there are provided linear motors which impart thrust to the pallet and air ducts for floating the transporting pallet in the air from the surface of the runway.

Since this runway uses linear motors and is a floating-in-the-air system, it must be long and requires precision of processing. In order to meet these requirements, as shown in FIG. 4 the construction of a conventional runway comprises two components, one being a table 21 forming the upper part of the runway and the other being a groove-shaped channel 22 with its upper part opened. These two components are combined to form the runway. The reason why the runway is composed of two different components is that while the table 21 requires a precise finish, the duct or channel 22 does not require such precise finish. Therefore complicated processing operations are required to make the runway, with the result of a high manufacturing cost. Moreover, in order to reduce the weight of the runway, while the table is made of light metal, such as an aluminum alloy, with open spaces 23 made by scooping, the duct 22 is made of steel from the cost point of view.

However, in the above construction, due to limitations of accuracy of measurement, the runway must be assembled with joints and therefore time is required for rectifying differences in level of abutting surfaces at each joint. In addition, since the runway is a combination of different materials as mentioned above, temperature differences are caused between the different materials due to heat generation of a linear motor provided in the grooveshaped duct 22, and deformation of the combined members due to a difference in the coefficients of thermal expansion of the different materials caused by thermal expansion of the runway or by variations in ambient temperature makes it difficult to maintain airtightness in the duct, with a resultant increase in air consumption.

Especially, the provision of linear motors in the runway has great effect on the thrust of the motors and the exposure of the linear motors makes it impossible to provide a necessary open space between the transporting table and the runway and reduces the floating effect. Moreover, manual operations are required for combining the table and the groove-shape duct.

In view of the above disadvantages of the conventional runway, the object of the present invention is to provide a runway which is characterized in that it does not include different kinds of metal or other materials. Open spaces for air ducts and an open space for installation of linear motors are provided separately, but the runway is made as a simple body for the purpose of decreasing air consumption, reducing in weight, facilitating the installation of the linear motors and enhancing the operation of the linear motors.

SUMMARY OF THE INVENTION

The present invention provides a runway for a conveyor whereby a transporting pallet which straddles the runway is floated in the air by air discharged from the runway and is transported by a linear motor provided in the runway. Air ducts to supply air to the upper part of a frame body constituting the runway are provided symmetrically within the body, a space in which the linear motors are to be arranged is provided in the body, a plurality of nozzle holes for discharging the air upward by and sideways from the air ducts are spaced in the lengthwise direction of the body, that part of the runway where a linear motor is to be installed is covered with a non-magnetic thin plate to replace a portion of the the upper surface of the runway and a cover is provided directly over the linear motor.

BRIEF DESCRIPTION OF THE DRAWINGS

The nature and advantages of the present invention will be understood more clearly from the following description made with reference to the accompanying drawings, in which.

DETAILED DESCRIPTION OF THE INVENTION

Figure 1:
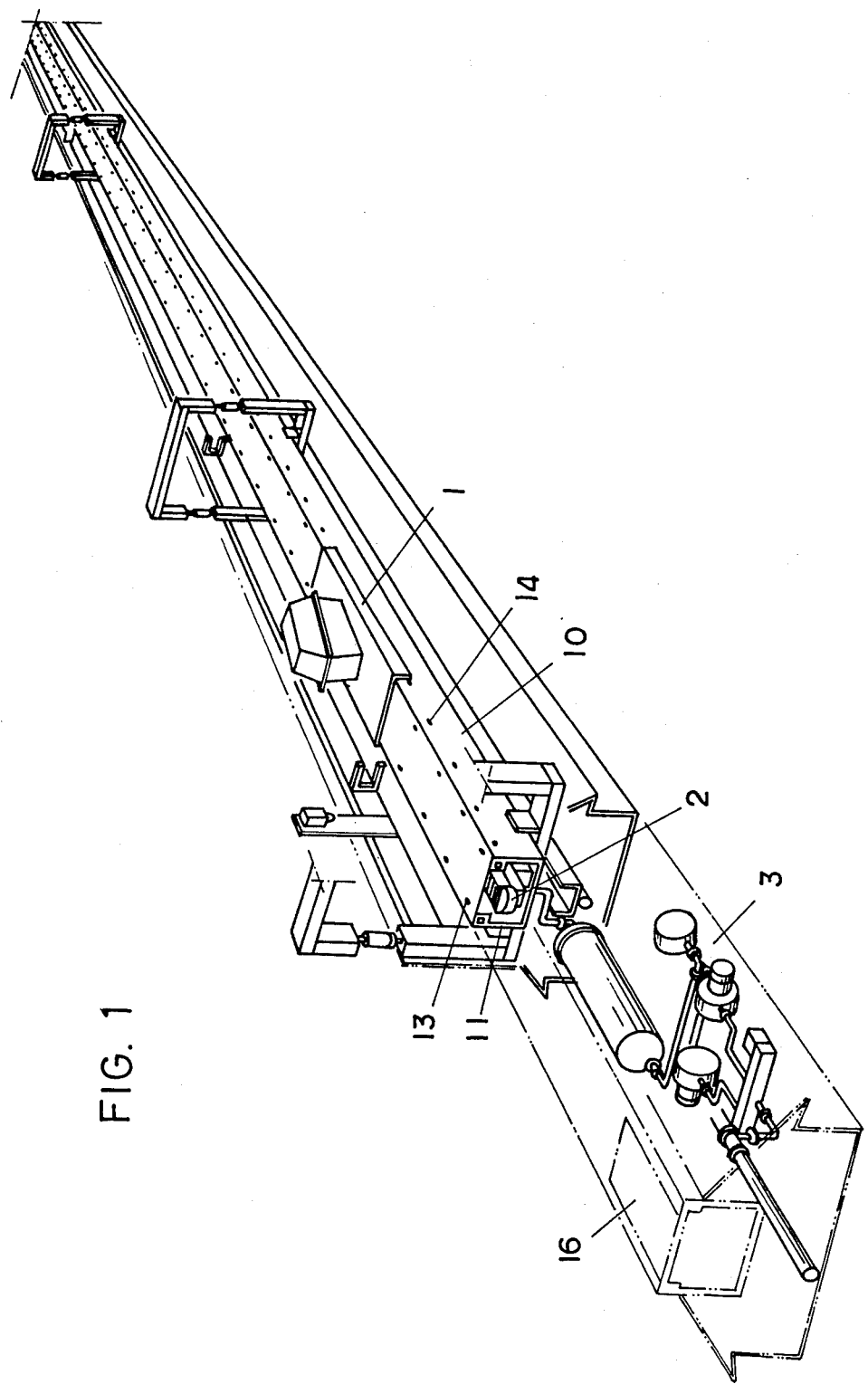
FIG. 1 is a perspective view of a runway in a conveyor means using linear motors according to the present invention.

As shown in FIG. 1, a transporting pallet 1 to be used for the present invemntion is provided in such a fashion that it straddles a runway 10. A linear motor is formed by a linear motor secondary side (not shown in the drawing) and a linear motor primary side 2, and the transporting pallet 1 is floated in the air right above the runway 10 by discharging air therefrom. At each stop point of the transporting pallet 1, there is provided a linear motor primary side 2 in the runway 10. Compressed clean air supplied from an air supply unit 3 is discharged through nozzle holes made at the upper surface of the runway 10 to support the transporting pallet 1 in the air. By controlling the linear motor 2, the transporting pallet 1 is moved or stopped.

Figure 2:
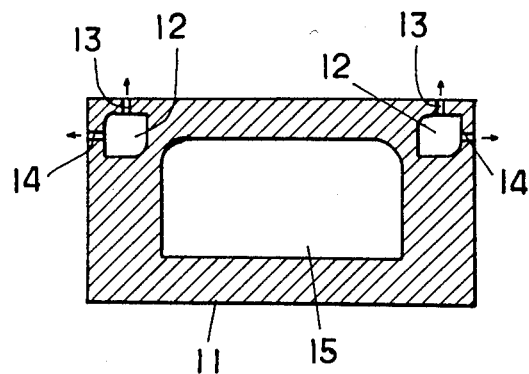
FIG. 2 is a vertical section of the runway, on an enlarged scale.
Figure 4:
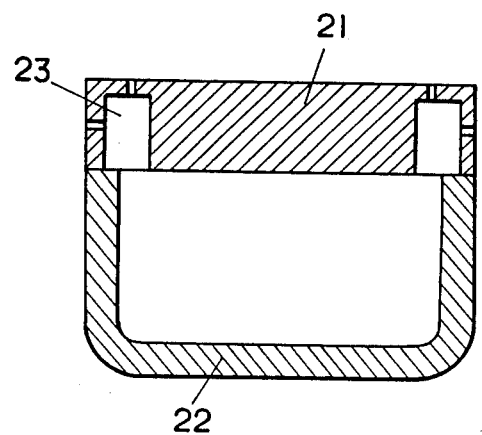
FIG. 4 is a vertical section of the conventional runway used universally.
Figure 3:
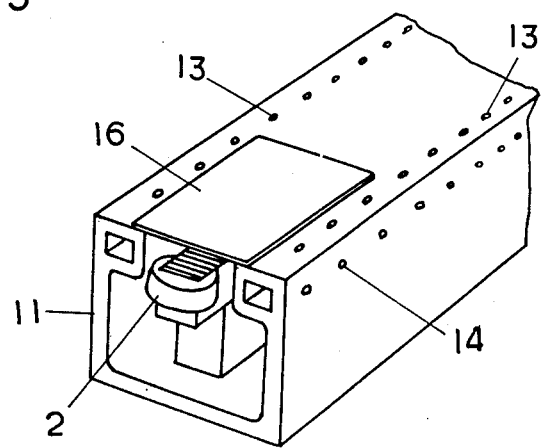
FIG. 3 is a perspective view of a part of an embodiment with a cover at the top surface of the runway.

FIG. 2 shows a vertical section of a part of the runway 10 according to the present invention (the part where a linear motor is not installed). Numeral 11 shows a body member formed of light metal, such as an aluminum alloy, and results from plastic extrusion through a metallic mold to a specified length. Numeral 12 denotes air ducts which are located symmetrically in at the upper part of the plastic body. Compressed clean air supplied from the air supply unit 3 is fed to the air ducts 12 and is discharged therefrom upwardly and sideways (both sides) through nozzle holes 13, 14, respectively. For this purpose, nozzle holes 13, 14 are provided at the upper surface and both sides of the body 11 from air ducts 12, and holes 13, 14 are located at a specified pitch in lengthwise direction of the runway 10. Numeral 15 is an open space of specified capacity provided in the runway and, in which a linear motor primary side 2 is installed. The part where the linear motor primary side 2 is not provided is left as an open space so that the weight of the runway is kept as small as possible. The upper part of the plastic body 11 corresponding to the position of linear motor primary side 2 is cut away so that it is not affected by action of the linear motor secondary side of the transporting pallet 1. The cut-away part is replaced with a cover 16 of non-megnetic material, such as stainless steel or synthetic resin, to maintain airtightness, as shown in FIG. 3.

In connecting runway sections in the lengthwise direction, the air ducts are connected through the medium of O-rings and the plastic bodies 11 are connected by connecting pieces (neither the O-ring nor the connecting piece are shown in the drawings).

When compressed air is supplied from the air supply unit 3 to the air ducts 12 of the runway 10, the compressed air is discharged upwardly and sideways (as shown by arrows in FIG. 2) through the nozzle holes 13, 14. As the transporting pallet 1 is mounted in such a fashion that it straddles the runway 10, the transporting pallet 1 is floated in the air by the discharged air above the runway 10, while maintaining equal spacings between the pallet and runway at both side surfaces of the runway 10.

By excitation controlling the linear motor primary side 2 provided inside the plastic body 11, the transporting pallet 1 equipped with the linear motor secondary side runs above and along the runway 10 and stops. In the illustrated embodiment, assuming the diameter of the nozzle hole is 0.4 mm., the pitch of the nozzle hole is 100 mm and the pressure of supplied air is 2 kg/cm$^2$, the transporting pallet 1 can be floated in the air 0.1 mm. above the surface of the runway 10. The air consumption is largely influenced by the weight of articles to be placed on the transporting pallet, but the transporting pallet according to the present invention can have loaded thereon articles of about three times the weight as the conventional arrangement with the same air flow rate.

According to the present invention, a runway in which open spaces for air ducts and an open space for linear motors are provided separately is extruded from a metallic mold and is formed into a body. Therefore, improvement in precision, reduction in weight and a better finish can be expected with the runway of the invention. Moreover, since each part is made of the same material, the runway according to the present invention is entirely free from the effects of a temperature difference between different kinds of metal. Since the air ducts are independent, there is no leakage of air from joints and air consumption can be reduced with the result that disturbance of air flow in the clean room is reduced. Also, the floating of the transporting pallet is not impaired and the function of the linear motor can be improved.

What is claimed is:

1. A runway for use in a conveyor of the type wherein a transportation pallet straddles the runway, is floated in the air by air discharged from the runway, and is moved along the runway by linear motors spaced along the runway, said runway comprising:

a longitudinal body of integral, one-piece construction, said body have an upper surface and opposite outwardly facing side surfaces;

an open space extending longitudinally through said body generally centrally thereof and forming an area for mounting linear motors within said runway;

two air ducts extending longitudinally through said body at positions symmetrically thereof and symmetrically of said open space;

upper air discharge holes extending through said body from each said air duct upwardly to said upper surface;

lateral air discharge holes extending through said body from each said air duct outwardly to the respective said side surface;

said upper and lateral air discharge holes being spaced longitudinally along said body.

2. A runway as claimed in claim 1, wherein said body is a lightweight metal alloy member formed by extrusion to include said longitudinally extending open space and air ducts.

3. A runway as claimed in claim 2, wherein portions of said body are cut away from said upper surface to said open space at positions spaced longitudinally of said body for mounting of linear motors, and further comprising covers of non-magnetic material removably mounted on said body at said spaced positions and covering respective said cut-away portions.

* * * * *